(12) United States Patent
Starke et al.

(10) Patent No.: US 9,136,686 B2
(45) Date of Patent: Sep. 15, 2015

(54) SEALING ELEMENT AND CONNECTING HOUSING HAVING A SEALING ELEMENT

(75) Inventors: Cord Starke, Blomberg (DE); Sebastian Schaefer, Blomberg (DE); Valeri Reimchen, Steinheim/Sandebeck (DE); Ansgar Engel, Marienmuenster (DE); Gerd Leinecke, Bad Pyrmont (DE); Sebastian Scholz, Hoexter (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 130 days.

(21) Appl. No.: 14/122,249

(22) PCT Filed: May 25, 2012

(86) PCT No.: PCT/EP2012/002247
§ 371 (c)(1),
(2), (4) Date: Nov. 26, 2013

(87) PCT Pub. No.: WO2012/163507
PCT Pub. Date: Dec. 6, 2012

(65) Prior Publication Data
US 2014/0182928 A1   Jul. 3, 2014

(30) Foreign Application Priority Data

May 27, 2011   (DE) .......................... 10 2011 103 351

(51) Int. Cl.
*H02G 3/22* (2006.01)
*H02G 15/013* (2006.01)
*H02G 15/113* (2006.01)
*H02G 15/117* (2006.01)

(52) U.S. Cl.
CPC .............. *H02G 15/013* (2013.01); *H02G 3/22* (2013.01); *H02G 15/113* (2013.01); *H02G 15/117* (2013.01)

(58) Field of Classification Search
CPC ............ H02G 3/00; H02G 3/02; H02G 3/22; H02G 3/24; H02G 3/28; H02G 3/30; H02G 3/36; H02G 15/00; H02G 15/013; H02G 15/007; H02G 15/04; H02G 15/113; H02G 3/083; H02G 3/08; H02G 15/117; B60R 16/0207; B60R 16/0222; B60R 16/0215
USPC ................ 174/50, 650, 654, 659, 72 A, 74 R, 174/152 G, 153 G, 559, 564, 135, 137 R, 174/138 R, 539, 554, 142, 152 R; 248/49, 248/68.1, 56; 16/2.1, 2.2
See application file for complete search history.

(56) References Cited

U.S. PATENT DOCUMENTS 5,422,436 A     6/1995  Zachrai
5,811,728 A *   9/1998  Maeda ....................... 174/152 G
(Continued)

FOREIGN PATENT DOCUMENTS

DE       4300521 A1    7/1994
DE      19701511 A1    7/1997
(Continued)

*Primary Examiner* — Angel R Estrada
(74) *Attorney, Agent, or Firm* — Leydig, Voit & Mayer, Ltd.

(57) ABSTRACT

A sealing element for sealing a cable inserted into a connecting housing, having a passage opening for the cable to pass through, is disk-shaped having at least one first disk having substantially u-shaped circumference, and a second disk having a substantially u-shaped circumference and resting on the first disk. The first disk has two opposite side flanks which extend parallel to each other, and the second disk has a first pair of flanks having two opposite side flanks, which are formed conically with respect to each other. On the top side of the first disk has a sealing lip which is connected to the side flanks respectively via a chamfered connecting region.

9 Claims, 7 Drawing Sheets

(56) References Cited

U.S. PATENT DOCUMENTS

| | | | |
|---|---|---|---|
| 6,787,701 B2* | 9/2004 | Yasuda et al. | 174/152 G |
| 7,186,929 B2* | 3/2007 | Cox et al. | 174/650 |
| 8,033,408 B2* | 10/2011 | Makela et al. | 174/152 G |
| 8,816,222 B2* | 8/2014 | Pimentel | 174/650 |
| 8,987,601 B2* | 3/2015 | Shiga et al. | 248/68.1 |
| 2003/0000726 A1 | 1/2003 | Miyakoshi | |
| 2009/0302034 A1 | 12/2009 | Maekelae et al. | |

FOREIGN PATENT DOCUMENTS

| | | |
|---|---|---|
| DE | 202010005085 U1 | 11/2010 |
| EP | 0560119 A1 | 9/1993 |
| FR | 2940534 A1 | 6/2010 |
| GB | 2261960 A | 6/1993 |
| JP | 2005168114 A | 6/2005 |
| WO | WO 9702637 A1 | 1/1997 |

\* cited by examiner

SEALING ELEMENT AND CONNECTING HOUSING HAVING A SEALING ELEMENT

CROSS-REFERENCE TO RELATED APPLICATIONS

This application is a U.S. National Stage application under 35 U.S.C. §371 of International Application No. PCT/EP2012/002247, filed on May 25, 2012, and claims benefit to German Patent Application No. DE 10 2011 103 351.7, filed on May 27, 2011. The International Application was published in German on Dec. 6, 2012, as WO 2012/163507 A2 under PCT Article 21(2).

FIELD

The invention relates to a sealing element for sealing a cable inserted into a connecting housing, having a passage opening for the cable to pass through. The invention also relates to a connecting housing for connecting conductors of two or more cables.

BACKGROUND

In order to seal a cable inserted into a connecting housing through a cable feed opening, drawing a substantially annular sealing element onto the external circumferential surface of the cable and then placing the cable together with the sealing element inside the housing is known, the sealing element being arranged in the cable feed opening of the connecting housing in order to protect the interior of the connecting housing from external influences in the region of the feed opening for the cable. For further sealing, the interior of the connecting housing can then be filled or injected with a sealant or sealing material If the connecting housing is formed by a lower housing part and an upper housing part it is normally provided for a first portion of the cable feed opening to be constructed in the lower housing part and a second portion of the cable feed opening to be constructed in the upper housing part, the sealing element being formed of two parts here and the first part being securely mounted in the lower housing part and the second part in the lower housing part before the cable is inserted. To connect a cable, the cable is then laid in the lower housing part on the first part of the sealing element. Then the upper housing part is fixed to the lower housing part so that the second part of the sealing element is also resting on the cable.

Both possible configurations have the disadvantage that the connecting housing and the cable connected therein cannot be reliably sealed against media acting from the outside.

SUMMARY

The invention provides a sealing element configured to seal a cable inserted into a connecting housing and having a passage opening configured for the cable to pass therethrough, the sealing being disc-shaped element. The sealing element includes a first disc having a substantially U-shaped circumference; and a second disc having a substantially U-shaped circumference and resting on the first disc. The first disc includes two first opposite side flanks, which extend parallel to each other. The second disc includes a first pair of flanks including two second opposite side flanks which are formed conically with respect to each other. The first disc includes, on its upper face connecting the two first opposite side flanks to each other, a sealing lip, the sealing lip being connected to each of the first opposite side flanks via a slanted connecting region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
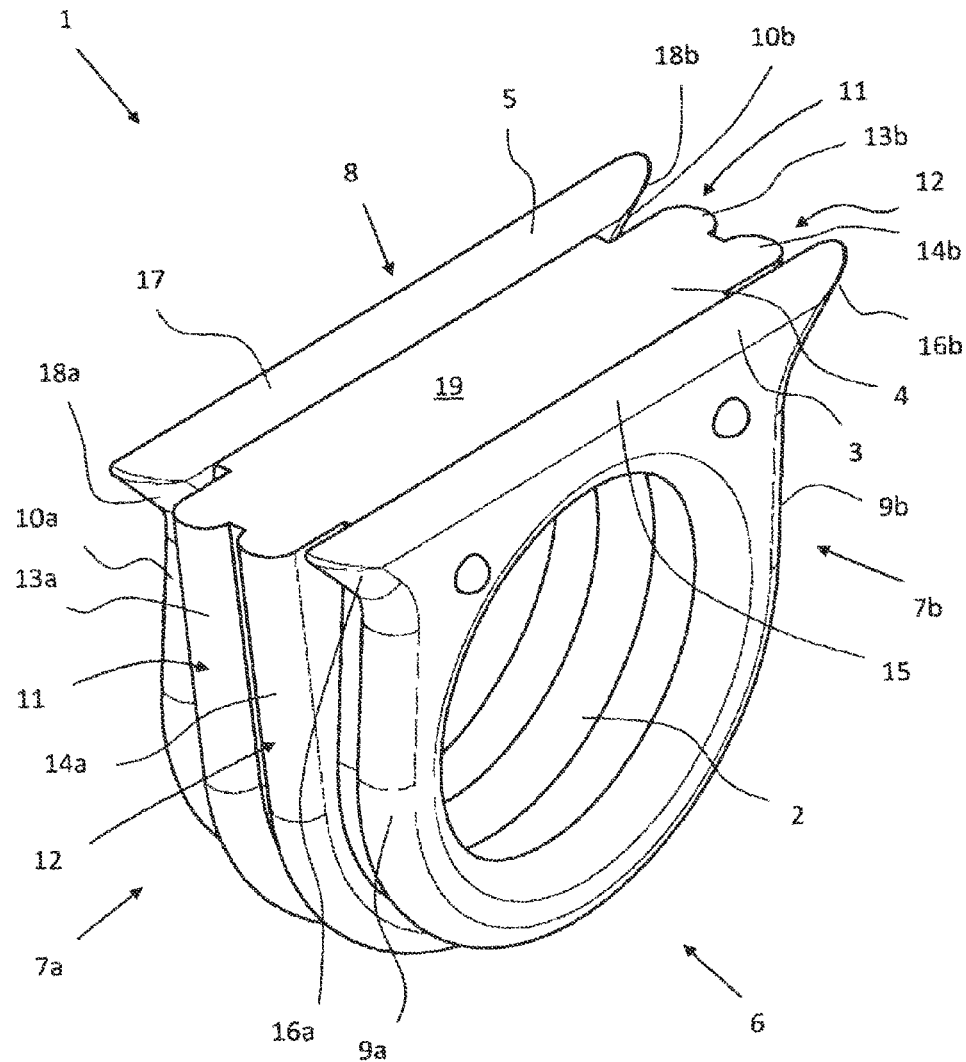
FIG. 1 shows a schematic perspective view of a sealing element according to the invention.

An aspect of the invention provides an improved sealing element and an improved connecting housing, with which the sealing action can be significantly improved.

The sealing element according to the invention is characterised in that, in contrast to previously known single-part sealing elements, which are drawn onto the external circumferential surface of the cable before the cable is inserted into a connecting housing, the sealing element is now formed by a plurality of adjacent discs. The sealing element is constructed such that it is substantially U-shaped in its longitudinal cross sectional area, a preferably circular ring-shaped passage opening being constructed substantially in the centre of the surface of the longitudinal face of the sealing element for the cable that is to be connected to be passed through. The sealing element can be drawn onto the external circumference of the cable in the form of a press-fit via this passage opening so that the external circumference of the cable is fully enclosed by the sealing element in the region of the sealing element.

The sealing element has at least two discs each having two opposite side flanks with which the sealing element rests on a connecting housing in the region of a cable feed opening of the connecting housing. The two side flanks of the first disc, with which the first disc rests on the connecting housing in the region of the cable feed opening, extend parallel to each other. In contrast, the two side flanks of the second disc extend conically with respect to each other so that the distance between the side flanks of the second disc becomes greater towards the upper face of the sealing element and disc. As a result of the conical form of the side flanks of the second disc, the side flanks of the second disc jut out from the side flanks of the first disc and form a rib-shaped bulge in relation to the side flanks of the first disc, whereby the side flanks of the second disc rest particularly tightly on the connecting housing by means of a press-fit. Preferably, the side flanks of the second disc jut out from and projects beyond the side flanks of the first disc at both the side regions and the lower face of the sealing element. In the region of the upper face of the sealing element, however, the first disc preferably projects beyond the second disc in that the first disc has a sealing lip on its upper face connecting the two side flanks of the first disc, said sealing lip being connected to each of the side flanks via a slanted connecting region. The sealing lip facilitates an especially tight seal with respect to the connecting housing in the region of the upper face of the sealing element. The sealing lip has a greater width than the rest of the first disc, particularly in the region of the side flanks so that especially in the region of the upper face of the sealing element, a gap between the sealing element and the connecting housing can be prevented particularly effectively. The slanted connecting region is preferably formed conically, as a result of which a compressive force acting on the sealing element via the sealing lip is introduced particularly favourably into the lower housing part by spreading the compressive force as it is introduced into the lower housing part.

According to a preferred embodiment of the invention the sealing element has a third disc that is substantially U-shaped in its circumference and has a form corresponding to that of the first disc, the third disc being arranged such that the second disc is arranged between the first disc and the third disc. The third disc therefore has two opposite side flanks, just like the first disc, which extend parallel to each other and has a sealing lip on its upper face connecting the two side flanks of the third disc to each other, said sealing lip being connected to each of the side flanks by a slanted connecting region. The form of the third disc is therefore substantially identical to that of the first disc. Because the third disc is arranged such that the second disc is arranged between the first disc and the third disc, the second disc is framed by two discs with substantially identical construction. The sealing element is therefore axially symmetrical, which makes it possible to insert the sealing element into a connecting housing from two sides, which makes the installation of the sealing element in a connecting housing easier and prevents assembly errors.

In order to increase the sealing action of the second disc, which is preferably arranged in the centre of a sealing element, it is preferable for the second disc, in addition to the first pair of flanks, to also have a second pair of flanks with two opposite side flanks, which are formed conically with respect to each other. The second pair of flanks is preferably constructed corresponding to the form of the first pair of flanks of the second disc so that, like the first pair of flanks, the second pair of flanks forms a rib-shaped bulge in the region of the side regions and the lower face of the sealing element. The sealing action of the second disc with respect to the connecting housing can be significantly improved as a result of the two rib-shaped bulges, which extend parallel to each other.

It is preferably also provided for the second disc to have a planar surface on its upper face connecting the side flanks to each other. The planar surface adjoins the sealing lips of the first disc and of the third disc, the planar surface being located lower than the sealing lips so that the two sealing lips project beyond the planar surface, which is formed between the two sealing lips. In the region of the upper face of the sealing element, the sealing element is therefore preferably more planar in its centre than at its side edge regions. The sealing action of the sealing element can also be improved further by means of this possible embodiment of the sealing element according to the invention.

According to a second teaching of the present invention, the aspect demonstrated above of a connecting housing to connect conductors of two or more cables is achieved in that the connecting housing has at least one cable feed opening, one lower housing part and one upper housing part, wherein a first portion of the cable feed opening is formed in the lower housing part and a second portion of the cable feed opening is formed in the upper housing part, wherein the lower housing part has a substantially circumferential rib forming an interior, which has a recess in the region of the cable feed opening, wherein a sealing element formed in one piece and having a passage opening for a cable to be connected is arranged in the cable feed opening in the recess of the rib, wherein the interior being formed by the rib is filled with a sealing material, and wherein a flat sealing element is arranged in the region of the rib between the lower housing part and the upper housing part.

In contrast to the connecting housings which are currently known, the sealing of the connecting housing according to the invention is therefore achieved using a rib formed on the lower housing part of the connecting housing, a sealing material filled into a region of an interior formed by the rib, in particular a rubber-like plastics material, a flat sealing element arranged between the rib of the lower housing part and the upper housing part and a sealing element formed in one piece arranged in the region of the cable feed opening. A particularly effective sealing of the connecting housing can be achieved through the combination of these various sealing elements. The connecting housing comprises two parts, being formed by an upper housing part and a lower housing part. The sealing element in the region of the cable feed opening is not rigidly preformed on the lower housing part and upper housing part in the form of a two-part design, but rather is a separate component formed in one piece, which, before being arranged inside the connecting housing, is initially drawn over the external circumference of the cable to be connected using a press-fit and then firstly inserted together with the cable into the cable feed opening formed in the lower housing part. As a result a particularly secure seal is possible, especially in the region between the cable, sealing element and connecting housing. In the process, the accommodation of the sealing element in the connecting housing in the region of the cable feed opening is designed such that the sealing element is compressed both axially to the cable and radially to the cable. A secure seal with respect to the upper housing part is achieved using the flat sealing element.

According to a preferred embodiment of the connecting housing, the flat sealing element is formed such that the flat sealing element at least partially overlaps the sealing element. This enables direct contact between the sealing element and the flat sealing element, the contact being in the region of the upper face of the sealing element which adjoins the upper housing part. This makes possible a particularly secure seal of the cable and the sealing element with respect to the upper housing part, this area normally constituting a major weak spot, particularly in two-part connecting housings.

The sealing element used in the connecting housing is particularly preferably a sealing element formed and developed as above, which is disc-shaped having at least one first disc having a substantially U-shaped circumference, and a second disc having a substantially U-shaped circumference and resting on the first disc, the first disc having two opposite side flanks, which extend parallel to each other, and the second disc having a first pair of flanks having two opposite side flanks, which are formed conically with respect to each other, the first disc having, on its upper face connecting the side flanks of the first disc to each other, a sealing lip, which is connected to each of the side flanks via a slanted connecting region. The sealing element can have a third disc having a substantially U-shaped circumference and a form corresponding to the first disc, the third disc being arranged such that the second disc is arranged between the first disc and the third disc. Furthermore, the second disc can have a second pair of flanks with two opposite side flanks, which are formed conically with respect to each other. The second disc can also have a planar surface on its upper face that connects the side flanks to each other. A sealing element formed in this way facilitates a particularly secure seal both with respect to the cable and the connecting housing, whereby an undesirable ingress of media into the connecting housing can be prevented particularly effectively.

For particularly reliable formation of the seal between the upper housing part and the lower housing part in the region of the cable feed opening, it is preferable for a region, which adjoins the cable feed opening, of the rib to have a slanted edge region. The slanted edge region is preferably adapted to the sealing lip and slanted connecting region of the first disc of the sealing element such that the sealing lip precisely covers the rib in the region of the slanted edge region and thus overlaps the cable feed opening towards the upper housing part and can seal particularly effectively.

Furthermore, it is preferable for the rib to have a bifurcation in the region of the cable feed opening, by means of which redundancy is achieved in the critical region at which the lower housing part, the upper housing part and the sealing element meet. The bifurcation of the rib is preferably formed at both ends of the rib, where the rib has a recess and adjoins the cable feed opening, the bifurcation preferably being in the form of a first rib arm and a second rib arm respectively, the first rib arm adjoining a side flank of the first disc and the second rib arm adjoining a side flank of the third disc by means of a press-fit so that an additional secure seal can be achieved in these regions.

According to another preferred embodiment of the connecting housing, the lower housing part has a protrusion in a region adjoining the cable feed opening. The protrusion is formed in the lower housing part below the connected cable and allows the sealing material, which has been introduced into the interior of the connecting housing, to also form adequately lower face the cable between the cable and the lower housing part, in order to achieve an improved seal in this region too.

There are now a large number of ways in which to configure and develop the sealing element according to the invention and the connecting housing according to the invention.

Figure 2:
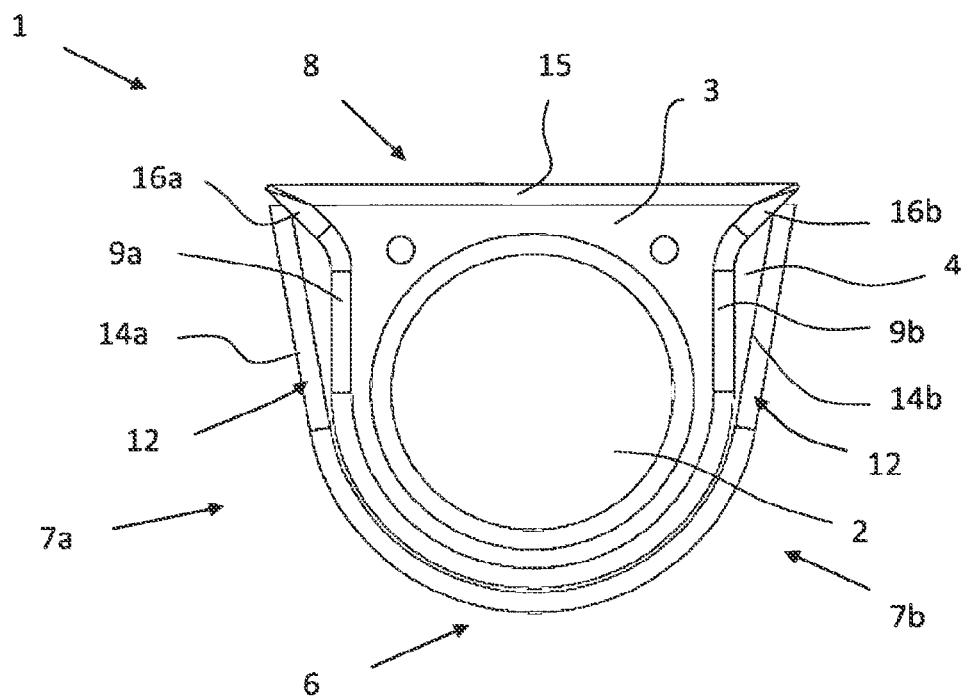
FIG. 2 shows a schematic view of the sealing element according to the invention shown in FIG. 1 in a plan view onto a longitudinal side of the sealing element.
Figure 3:
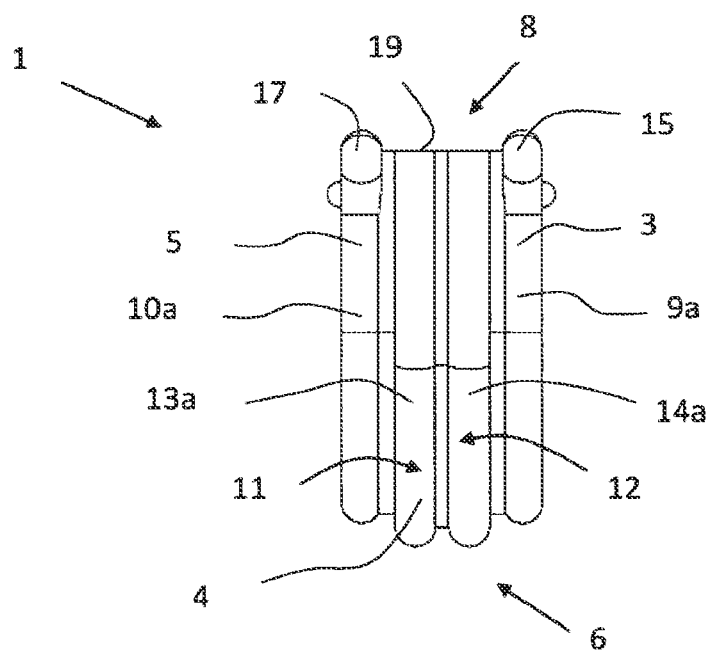
FIG. 3 shows a schematic view of the sealing element according to the invention shown in FIG. 1 in a plan view onto a transverse side of the sealing element.
Figure 4:
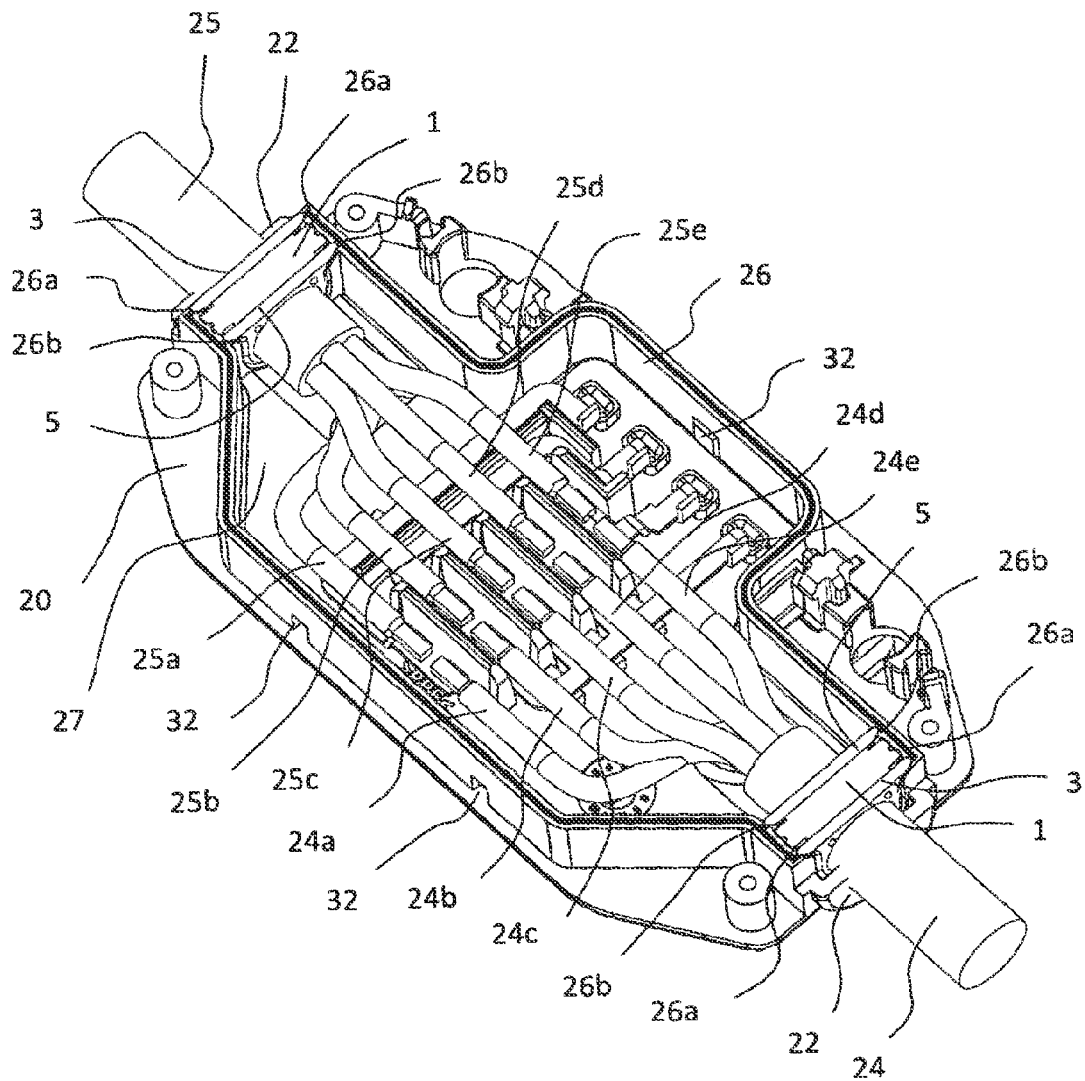
FIG. 4 shows a schematic view of a lower housing part of a connecting housing according to the invention with two cables inserted into the lower housing part and two sealing elements arranged in the region of the cable feed openings of the lower housing part, which is formed according to the sealing element according to the invention shown in FIG. 1.

In FIG. 1, FIG. 2 and FIG. 3 the sealing element 1 according to the invention according to a preferred embodiment is shown in various views. The sealing element 1, which is produced from an elastic plastics material, serves to seal a cable inserted into a connecting housing, as shown in FIG. 4 for example. The sealing element 1 is formed as a one-piece component and has a passage opening 2 for a cable, which is not shown in FIGS. 1 to 3, to pass through. The sealing element 1 is disc-shaped and in the embodiment shown here has three adjoining discs 3, 4, 5, which are connected to each other in an integral bond and have substantially U-shaped circumferences. Because of the U-shaped form of the discs 3, 4, 5, the form of the whole sealing element 1 is substantially U-shaped. In this case, the sealing element 1 has a lower face 6, two side regions 7a, 7b and an upper face 8. In the region of the lower face 6, the sealing element 1 and therefore also the discs 3, 4, 5 are substantially semi-circular. In the region of the upper face 8, the sealing element 1 and therefore also the discs 3, 4, 5 are substantially straight. The form of the side regions 7a, 7b of the sealing element 1 is determined by the individual discs 3, 4, 5 of the sealing element. The discs 3, 4, 5 themselves are rounded in the region of the lower face 6 and the side regions 7a, 7b of the sealing element 1 along their border or their edge region.

The first disc 3 and the third disc 5 have substantially the same form. In the region of the side regions 7a, 7b of the sealing element 1, the first disc 3 has two opposite side flanks 9a, 9b, which extend parallel to each other so that the distance between them does not change substantially in the region of the side regions 7a, 7b. In the region of the side regions 7a, 7b of the sealing element 1, the third disc 5 likewise has two opposite side flanks 10a, 10b, which extend parallel to each other so that the distance between them does not change substantially in the region of the side regions 7a, 7b.

The second disc 4 is arranged between the first disc 3 and the third disc 5 and, in the embodiment shown here, has a first pair of flanks 11 and a second pair of flanks 12, which are arranged parallel to each other. The first pair of flanks 11 has two opposite side flanks 13a, 13b, which are formed conically with respect to each other, i.e. such that the distance between the opposite side flanks 13a, 13b enlarges from the lower face 6 of the sealing element 1 towards the upper face 8 of the sealing element 1. The second pair of flanks 12 likewise has two opposite side flanks 14a, 14b, which are formed conically with respect to each other. Because of the conical form of the side flanks 13a, 13b, 14a, 14b of the second disc 4, the side flanks 13a, 13b, 14a, 14b of the second disc 4 jut out from the side flanks 9a, 9b of the first disc 3 and the side flanks 10a, 10b of the third disc 5 and form a rib-shaped bulge in relation to the side flanks 9a, 9b of the first disc 3 and the side flanks 10a, 10b. The side flanks 13a, 13b, 14a, 14b of the second disc 4 jut out from and project beyond the side flanks 9a, 9b of the first disc 3 and the side flanks 10a, 10b of the third disc 5 at both the side regions 7a, 7b and the lower face 6 of the sealing element 1. A rib-shaped bulge of the side flanks 13a, 13b, 14a, 14b of the second disc 4 of the sealing element is thus formed over the whole region of the side regions 7a, 7b and the lower face of the sealing element 1.

On the upper face 8 of the sealing element 1 the first disc 3 has a sealing lip 15, which is connected to each of the side flanks 9a, 9b of the first disc 3 via a slanted connecting region 16a, 16b. The sealing lip 15 has a longer length than the distance between the two side flanks 9a, 9b so that the two slanted connecting regions 16a, 16b are formed conically starting from the side flanks 9a, 9b in the direction of the sealing lip 15, i.e. such that the distance between the slanted connecting regions 16a, 16b enlarges towards the sealing lip 15.

Likewise on the upper face 8 of the sealing element 1 the third disc 5 has a sealing lip 17, which is connected to each of the side flanks 10a, 10b of the third disc 5 via a slanted connecting region 18a, 18b. The sealing lip 17 has a longer length than the distance between the two side flanks 10a, 10b so that the two slanted connecting regions 18a, 18b are formed conically starting from the side flanks 10a, 10b in the direction of the sealing lip 17, i.e. such that the distance between the slanted connecting regions 18a, 18b enlarges towards the sealing lip 17.

The second disc 4 is flat or planar in the region of the upper surface 8 of the sealing element. This planar surface 19 of the second disc 4 adjoins the sealing lip 15 of the first disc 3 and the sealing lip 17 of the third disc 5, the planar surface 19 of the second disc 4 being located lower than the sealing lips 15, 17, which can be seen particularly in FIG. 3, such that the two sealing lips 15, 17 project beyond the planar surface 19, which is formed between the two sealing lips 15, 17.

Figure 7:
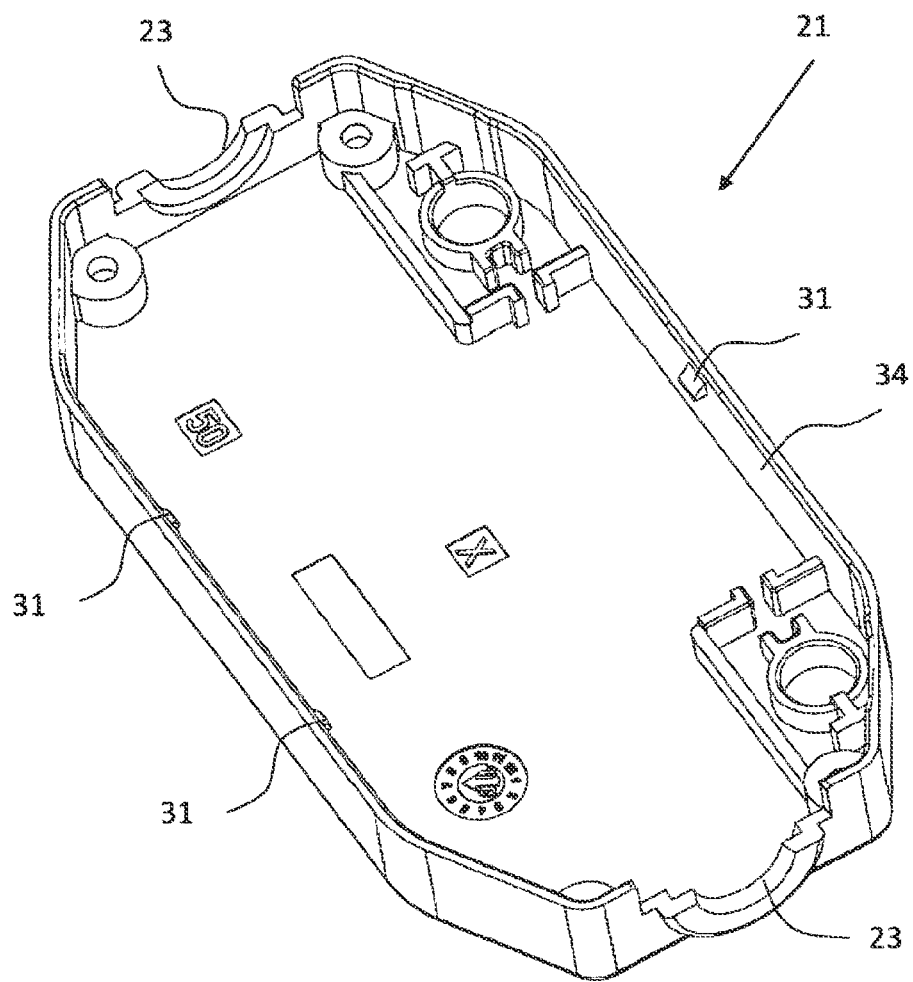
FIG. 7 shows a schematic view of an upper housing part of a connecting housing according to the invention.

In FIG. 4 a lower housing part 20 of a connecting housing according to a possible embodiment of the invention is shown, inside which a sealing element 1 as previously described can be arranged. In FIG. 7 an upper housing part 21 is shown, which can be connected to the lower housing part 20 to form the connecting housing. In the embodiment shown here, the connecting housing has two cable feed openings, which are each divided into portions, a first portion 22 of the cable feed opening being formed in the lower housing part 20 and a second portion 23 in the upper housing part 21 respectively. A cable 24, 25 is inserted into the connecting housing via each respective cable feed opening.

Figure 5:
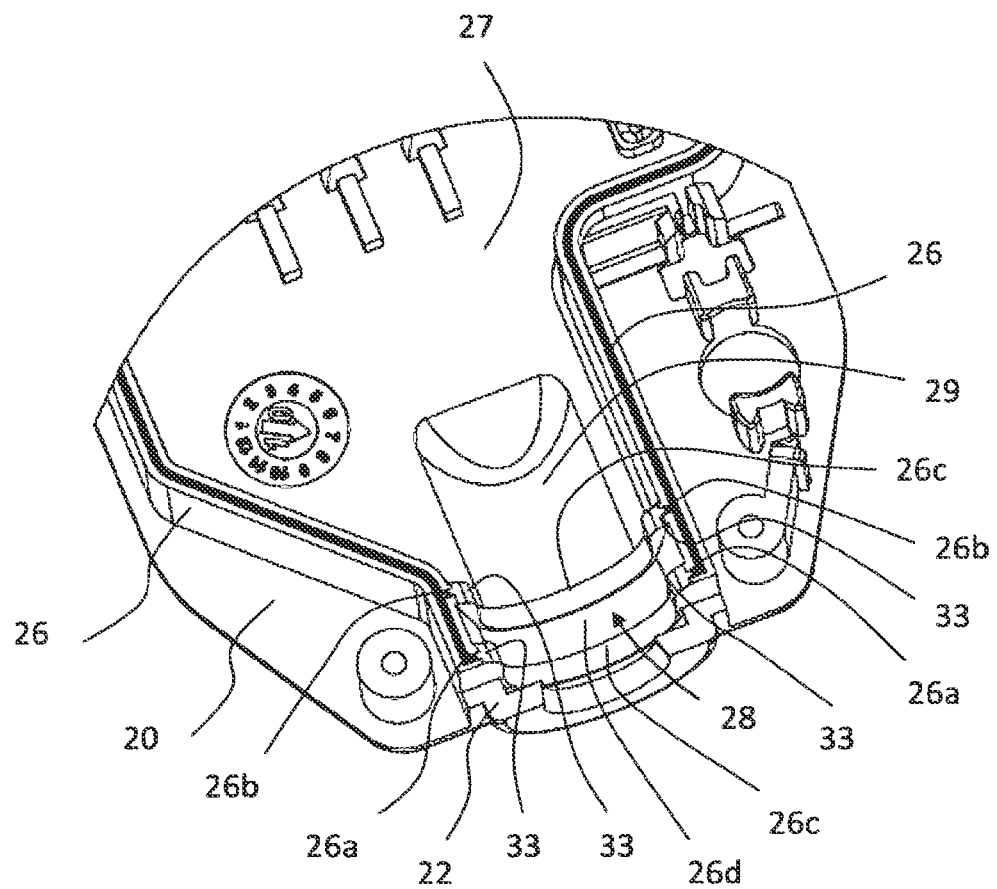
FIG. 5 shows a schematic detailed view of the lower housing part according to the invention shown in FIG. 4.

The lower housing part 20 has a substantially circumferential rib 26, which forms the border of an interior 27 of the connecting housing, in which the individual conductors 24a-24e, 25a-25e of the cables 24, 25 are contacted. The rib 26 here can be formed in one piece on the lower housing part 20, from the same material as the lower housing part 20. In the region of the cable feed openings the course of the rib 26 is interrupted so that the rib 26 has a recess 28, as shown in FIG. 5 in particular. The sealing element 1 is arranged in the cable feed opening such that the side flanks 9a, 9b, 10a, 10b, 13a, 13b, 14a, 14b of the individual discs 3, 4, 5 of the sealing element 1 rest on the rib 26. In the region of each of the two cable feed openings, the rib 26 has a bifurcation adjoining the recess 28. The bifurcation is in the form of a first rib arm 26a and a second rib arm 26b respectively, the first rib arm 26a adjoining a side flank 9a, 9b of the first disc 3 and the second rib arm 26b adjoining a side flank 10a, 10b of the third disc 5. As shown in FIG. 5 the rib arms 26a, 26b each bridge the recess 28 by means of a bulge 26c formed respectively along the circumferential surface of the recess, on which bulges the lower face 6 of the sealing element 1, in particular that of the first disc 3 and the third disc 5, rests. Between the bulges 26c a depression 26d is formed, in which the rib-shaped bulges of the two pairs of flanks 11, 12 of the second disc 4 rest.

After the cables 24, 25 with the sealing elements 1 arranged on them have been positioned inside the lower housing part 20 and the conductors 24a 24e, 25a-25e have been connected to the contacts formed inside the connecting housing, in particular inside the lower housing part 20 of the connecting housing, a sealing material, which is not shown here, is injected or poured into the interior 27 defined by the rib 26 so that the sealing material spreads into the whole interior and fills it completely. The sealing material is preferably a plastic injection moulding material.

So that the sealing material can also totally enclose the cables 24, 25 inserted into the connecting housing, the lower housing part 20 has an indentation 29, which can be seen in FIG. 5 in particular, in a region adjoining the cable feed opening. The indentation 29 is preferably formed as a recess or bulge in the lower housing part 20 and extends from the recess 28 of the rib 26 and the arrangement of the sealing element 1 in the recess 28 up to the point in the interior 27 of the connecting housing, from where the cable 24, 25 has been stripped and the individual conductors 24a-24e, 25a-25e of the cable 24, 25 are exposed, as shown in FIG. 4.

Figure 6:
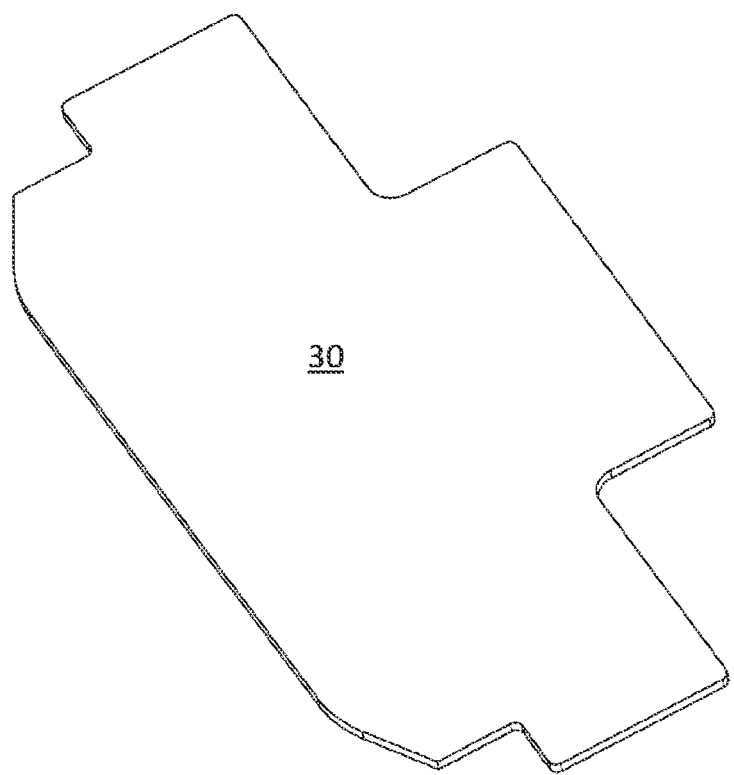
FIG. 6 shows a schematic view of a flat sealing element according to the invention in a perspective view.

After the sealing material has been injected into the interior 27, a flat sealing element 30 as shown in FIG. 6 is laid onto the lower housing part 20 such that the flat sealing element 30 rests on the rib 26 and at least partially on the sealing elements 1. In this process, the contour of the flat sealing element 30 is adapted using a stamping process to the form of the rib 26 such that it fully covers the rib 26. The flat sealing element 30 is preferably constructed in the form of a thin rubber mat. In the embodiment shown in FIG. 6, the flat sealing element 30 covers the whole surface. It is, however, also possible, for the flat sealing element 30 to have a recess in the region of the interior 27 of the lower housing part 20 so that the flat sealing element 30 does not fully overlap the interior 27.

Finally, to close the connecting housing an upper housing part 21, as shown in FIG. 7, is placed onto the lower housing part 20 and preferably fixed by means of locking elements 31, which can engage with the recesses 32 formed on the rib 26, as can be seen in FIG. 4, and additional screws, which are not shown here, which are fixed in the region of the cable feed opening. To simplify assembly, the flat sealing element 30 can be fixed, in particular bonded by means of an adhesive connection, to the interior surface of the upper housing part 21 that points towards the lower housing part 20. In the fixed or assembled state, the edge 34 of the upper housing part 21 rests tightly on the external of the rib 26, which points away from the interior 27 of the lower housing part.

Figure 8:
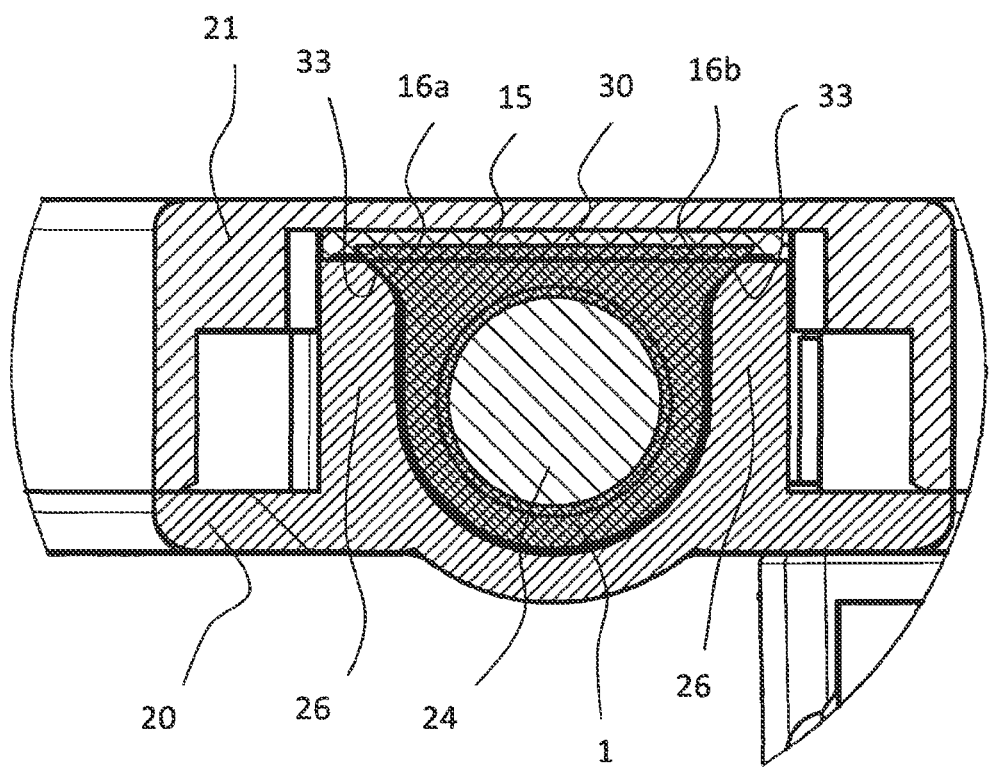
FIG. 8 shows a schematic cross-sectional view along the transverse side of the connecting housing according to the invention in the region of the cable feed opening.

In FIG. 8 a cross-sectional view through a fully assembled connecting housing is shown, in which a cable 24, 25 provided with a sealing element 1 is arranged in a cable feed opening of the connecting housing and a flat sealing element 30, which covers the upper face 8 of the sealing element 1, rests between the lower housing part 20 and the rib 26 of the lower housing part 20 respectively and the upper housing part 21. In the region of the sealing element 1 the flat sealing element 30 rests particularly tightly on the sealing lips 15, 17 of the first disc 3 and the third disc 5. Furthermore, it can be seen here that a region of the rib 26, which adjoins the cable feed opening, has a slanted edge region 33. As can be seen particularly in FIG. 5, the slanted edge region 33 is formed on each of the free ends of the rib arms 26a, 26b, which adjoin the side flanks 9a, 9b, 10a, 10b of the first disc 3 and the third disc 5. This facilitates the insertion of the sealing element 1 into the recess 28 of the rib 26 in the region of the cable feed opening The connecting housing according to the invention can preferably be used as a so-called solar connecting housing for solar connectors.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS

Sealing element 1
Passage opening 2
First disc 3
Second disc 4
Third disc 5
Lower face 6
Side region 7a, 7b
Upper face 8
Side flank 9a, 9b
Side flank 10a, 10b
First pair of flanks 11
Second pair of flanks 12
Side flank 13a, 13b
Side flank 14a, 14b
Sealing lip 15
Slanted connecting region 16a, 16b
Sealing lip 17
Slanted connecting region 18a, 18b
Planar surface 19
Lower housing part 20
Upper housing part 21
First portion of the cable feed opening 22
Second portion of the cable feed opening 23
Cable 24
Conductor 24a 24e
Cable 25
Conductor 25a 25e
Rib 26
Rib arm 26a, 26b
Bulge 26c
Depression 26d
Interior 27
Recess 28
Indentation 29
Flat sealing element 30
Locking element 31
Recess 32
Slanted edge region 33

The invention claimed is:

1. A sealing element configured to seal a cable inserted into a connecting housing and having a passage opening configured for the cable to pass therethrough, the sealing element being disc-shaped and comprising:
a first disc having a substantially U-shaped circumference; and
a second disc having a substantially U-shaped circumference and resting on the first disc,
wherein the first disc includes two first opposite side flanks which extend parallel to each other,
wherein the second disc includes a first pair of flanks including two second opposite side flanks, which are formed conically with respect to each other,
wherein the first disc includes, on its upper face connecting the two first opposite side flanks to each other, a sealing lip, the sealing lip being connected to each of the first opposite side flanks via a slanted connecting region.

2. The sealing element of claim 1, further comprising:
a third disc having a substantially U-shaped circumference,
wherein the third disc has a form corresponding to that of the first disc, and
wherein the third disc is disposed such that the second disc is disposed between the first disc and the third disc.

3. The sealing element of claim 1, wherein the second disc includes a second pair of flanks including two third opposite side flanks, which are formed conically with respect to each other.

4. The sealing element of claim 1, wherein the second disc has a planar surface on its upper face connecting the third opposite side flanks to each other.

5. A connecting housing configured for connecting conductors of two or more cables, the connecting housing comprising: a cable feed opening; a lower housing part; and an upper housing part, wherein a first portion of the cable feed opening is formed in the lower housing part, wherein a second portion of the cable feed opening is formed in the upper housing part, wherein the lower housing part has a substantially circumferential rib forming an interior, wherein the rib includes a recess in the region of the cable feed opening, wherein a sealing element formed in one piece and having a passage opening configured a cable to be connected is disposed in the cable feed opening in the recess of the rib, wherein the sealing element includes: a first disc having a substantially U-shaped circumference; and a second disc having a substantially U-shaped circumference and resting on the first disc, wherein the first disc includes two first opposite side flanks which extend parallel to each other, wherein the second disc includes a first pair of flanks including two second opposite side flanks which are formed conically with respect to each other, wherein the first disc includes, on its upper face connecting the two first opposite side flanks to each other, a sealing lip, the sealing lip being connected to each of the first opposite side flanks via a slanted connecting region; wherein the interior formed by the rib is filled with a sealing material, and wherein a flat sealing element is disposed in region of the rib between the lower housing part and the upper housing part.

6. The connecting housing of claim 5, wherein the flat sealing element at least partially overlaps the sealing element.

7. The connecting housing of claim 5, wherein a region of the rib which adjoins the cable feed opening, has a slanted edge region.

8. The connecting housing of claim 5, wherein the rib includes a bifurcation in the region of the cable feed opening.

9. The connecting housing of claim 5, wherein the lower housing part includes an indentation at a region adjoining the cable feed opening.

* * * * *